United States Patent
Hacker

(10) Patent No.: US 11,148,142 B2
(45) Date of Patent: Oct. 19, 2021

(54) SYSTEM AND METHOD FOR VISUAL VERIFICATION OF SECURE CLOSURE OF COLLECTION BOTTLE THROUGH CHEMILUMINESCENCE

(71) Applicant: Nano 2.0 Business Press, LLC, Delray Beach, FL (US)

(72) Inventor: Steven M. Hacker, Delray Beach, FL (US)

(73) Assignee: Nano 2.0 Business Press, LLC, Delray Beach, FL (US)

( * ) Notice: Subject to any disclaimer, the term of this patent is extended or adjusted under 35 U.S.C. 154(b) by 332 days.

(21) Appl. No.: 16/449,399

(22) Filed: Jun. 23, 2019

(65) Prior Publication Data

US 2020/0398273 A1    Dec. 24, 2020

(51) Int. Cl.
  *B01F 11/00* (2006.01)
  *B01L 3/00* (2006.01)
  *G01N 21/76* (2006.01)

(52) U.S. Cl.
  CPC ....... *B01L 3/50825* (2013.01); *B01F 11/0005* (2013.01); *G01N 21/76* (2013.01); *B01L 2200/0689* (2013.01); *B01L 2200/141* (2013.01); *B01L 2300/042* (2013.01); *B01L 2300/046* (2013.01); *B01L 2300/0832* (2013.01)

(58) Field of Classification Search
  CPC .......... B01F 11/0005; B01L 2200/0689; B01L 2200/141; B01L 2200/145; B01L 2300/0832; B01L 3/50825; B01L 2300/042; B01L 2300/046; B01L 3/527; G01N 21/9054; G01N 21/76
  See application file for complete search history.

(56) References Cited

U.S. PATENT DOCUMENTS

| | | | |
|---|---|---|---|
| 3,489,307 A | | 1/1970 | Wenger |
| 3,764,796 A | | 10/1973 | Gilliam et al. |
| 3,774,022 A | | 11/1973 | Dubrow et al. |
| 3,813,534 A | * | 5/1974 | Gilliam .................... F21K 2/06 362/34 |
| 3,819,925 A | | 6/1974 | Richter |
| 3,933,118 A | | 1/1976 | Lyons |
| 5,207,341 A | | 5/1993 | Yeager |

(Continued)

*Primary Examiner* — Shogo Sasaki
(74) *Attorney, Agent, or Firm* — Nancy J. Flint, Attorney At Law, P.A.; Nancy J. Flint, Esq.

(57) ABSTRACT

A collection bottle that emits light once the lid of the bottle is rotated to its complete closed position is disclosed. An annular chamber concentric to the inner chamber of the collection bottle contains a dye such as fluorophor, a base catalyst, and diphenyl oxalate. A containment device is disposed in the annular chamber. The containment device holds one or more glass or other fragile material encasing vials containing hydrogen peroxide. The containment device is disposed in the vicinity of the bottle screw threads such that when the lid is completely screwed onto the collection bottle, a detent that is disposed above the superior lid screw thread compresses the exterior wall of the annular chamber and containment device, causing rupture of the vial(s) and allowing the hydrogen peroxide disposed therein to mix with the dye, base catalyst and diphenyl oxalate in the annular chamber. The subsequent chemical reaction causes the emission of light, visually indicating full closure of the lid on the collection bottle.

10 Claims, 7 Drawing Sheets

(56) References Cited

U.S. PATENT DOCUMENTS

| | | | |
|---|---|---|---|
| 5,954,215 A | 9/1999 | Alter | |
| 6,685,331 B1 * | 2/2004 | Rockwell | F21K 2/06 |
| | | | 220/506 |
| 8,939,311 B2 * | 1/2015 | Christopoulos | B65D 17/4011 |
| | | | 220/521 |
| 9,365,334 B2 * | 6/2016 | Christopoulos | B65D 17/4011 |
| 9,527,661 B2 * | 12/2016 | Fu | B65D 65/466 |
| 9,687,849 B2 | 6/2017 | Bruno et al. | |
| 9,827,585 B2 * | 11/2017 | Bintig | B05C 1/00 |
| 2007/0175853 A1 | 8/2007 | Kebben | |
| 2007/0272698 A1 | 11/2007 | Brown et al. | |
| 2014/0158688 A1 | 6/2014 | Loughrin et al. | |

\* cited by examiner

SYSTEM AND METHOD FOR VISUAL VERIFICATION OF SECURE CLOSURE OF COLLECTION BOTTLE THROUGH CHEMILUMINESCENCE

FIELD OF THE INVENTION

The invention relates to a collection bottle that emits light once the lid of the bottle is rotated to its complete closed position. An annular chamber concentric to the inner chamber of the collection bottle contains a dye such as fluorophor, a base catalyst, and diphenyl oxalate. A containment device is disposed in the annular chamber. The containment device holds one or more glass or other fragile material encasing vials containing hydrogen peroxide. The containment device is disposed in the vicinity of the bottle screw threads such that when the lid is completely screwed onto the collection bottle, a detent that is disposed above the superior lid screw thread compresses the exterior wall of the annular chamber and containment device, causing rupture of the vial(s) and allowing the hydrogen peroxide disposed therein to mix with the dye, base catalyst and diphenyl oxalate in the annular chamber. The subsequent chemical reaction causes the emission of light, visually indicating full closure of the lid on the collection bottle.

BACKGROUND OF THE INVENTION

It is common practice for physicians and surgeons to remove human tissue from the body and then place such tissue in a specimen collection bottle containing fixative to enable processing of the tissue so that a pathologist may render a diagnosis of the tissue. During the rush of surgery or rapid pace of outpatient and inpatient biopsies, the surgeon may forget to place the tissue into the collection bottle; unknowingly lose the specimen; or may accidentally dispose of small specimens after they are thought to have been placed into a collection bottle. Further, in haste after putting a specimen in the collection bottle, the lid may not be completely closed and leakage or spillage and loss of the specimen can occur. Also, the physician or surgical team or the lab collecting the collection bottles needs quick verification that collection bottles are completely closed and leak proof and that the surgical team securely closed the bottle after inserting the specimen. The lab or the surgical team may not remember to carefully examine the collection bottle to ensure and confirm that the specimen was placed therein or else the specimen may be so small it may be difficult to visualize its presence in the collection bottle. As a result, pathology labs, not infrequently, receive a collection bottle with no tissue inside or where the bottle has been opened and the lid was not completely closed and the specimen has spilled. It is important that a confirmation and verification of closure of the lid after specimen insertion into the collection bottle is performed prior to leaving surgical room.

During biopsies or other lab tests, materials such as human tissue specimens, proteins and blood, aspirates, and other body fluids, such as urine, routinely are taken from individuals by medical personnel for laboratory analysis. The typical specimen is collected at one location, such as at a medical doctor's office or a hospital, and then transported to a clinical laboratory site where the specimen is subjected to analysis. The specimen usually is collected by the medical personnel in a collection bottle and is then shipped or transported in the same bottle to the clinical laboratory. The clinical laboratory site may be distant from the specimen collection site and the collection bottle may be forwarded by courier, car, express mail or air, either through a drop off box at the physician office or hospital. The courier is responsible to make sure that the collection bottles are closed completely to avoid leakage and spillage and that specimens have been inserted into the collection bottles before mailing, shipping, or couriering of the bottles. However, the courier is often tasked with multiple pick up sites and is in a hurry.

Leak proof specimen collection bottles are known in the art. See, e.g., U.S. Pat. No. 9,687,849 B2 to Bruno et al. titled LEAK PROOF, AIR TIGHT PLASTIC CONTAINER DEVICE which discloses a liquid specimen container that provides two independent, internal seals that protect the liquid contents therein; U.S. Patent Publn. No. US2007/0272698 to Brown et al. titled AN IMPROVED CONTAINER which discloses a cylindrical container having moveable piston means and a sealing means for sealing between the piston means and the container; U.S. Patent Publn. No. US2014/0332535 A1 to Grant et al. titled SEAL RING FOR SEALING A CONTAINER which discloses a seal ring for a container having a locking band that is configured to lock beneath an external engagement element of the container so as to secure the seal ring thereto; U.S. Patent Publn. No. US2014/0158688 A1 to Loughrin et al. titled CONTAINER AND CLOSURE which discloses a closure for a container having a sealing member having a retention member for engaging a holding member of the container to retain the sealing member; and U.S. Pat. No. 5,954,215 to Alter titled LEAK-PROOF CONTAINER which discloses a closure for a container having a first seal and a second seal for sealing engaging the inner face of a container wall.

The closure and sealing of bottles with sealing caps and lids is also well known. See, e.g., U.S. Patent Publn. No. US2007/0175853 to Kebben titled SEALING CAP which discloses a sealing cap that is to be screwed or pressed onto the pouring neck of a container; U.S. Pat. No. 3,489,307 to Wenger titled SCREW-TYPE CAP HAVING FULCRUM SEAL which discloses screw-type caps for containers where the cap has an internal liner the edge portion of which is adapted to engage the sealing edge at the neck of a container and to be deflected upwardly by the edge; and U.S. Pat. No. 5,207,341 to Yeager titled TAMPER EVIDENT WIDE MOUTH CONTAINER AND LID which discloses a bottle comprising a wide mouth container and a closure lid, where the container and the closure lid have corresponding fastening means for opening and closing the container.

Packaged chemiluminescent materials are further well known. See, e.g., U.S. Pat. No. 3,774,022 to Dubrow et al. titled PACKAGED CHEMILUMINESCENT MATERIAL which discloses a combined package of a chemiluminescent agent and an activating agent that are separated by a medium, wherein when the medium is ruptured a reaction occurs with the emission of visible light; U.S. Pat. No. 3,764,796 to Gilliam et al. titled CHEMICAL LIGHTING DEVICE which discloses a chemical lighting device having an outer cylindrical sleeve of light emitting material and first and second frangible ampoules containing a chemiluminescent material and an activator material positioned within the outer cylindrical sleeve, where breaking of the ampoules causes light to be obtained by mixing of the chemiluminescent material and the activator; U.S. Pat. No. 3,819,925 to Richter et al. titled CHEMILUMINESCENT DEVICE which discloses radiation cross-linked polyolefins for fabricating chemiluminescent systems which utilize oxalate ester-fluorescer solutions; and U.S. Pat. No. 3,933,118 to Lyons et al. titled CHEMILUMINESCENT SIGNAL DEVICE which discloses a signal device combining a fluorescent or phosphorescent light tube and a weighted base to be through or dropped from a vehicle as a warning marker, wherein an outer cylindrical tube of the chemical lighting device contains a frangible ampoule containing an activator material which upon breaking is mixed with chemiluminescent material contained in the tube.

The chemiluminescence reaction is well known. Specifically, it is known that diphenyl oxalate is a solid whose oxidation products are responsible for chemiluminescence. This chemical is the double ester of phenol with oxalic acid. Upon reaction with hydrogen peroxide, 1,2-dioxetanedione is formed, along with release of the two phenols. The 1,2-dioxetainedone then reacts with a dye molecule, decomposing to form carbon dioxide and leaving the dye in an excited state. As the dye relaxes back to its unexcited state, it releases a photon of visible light. The reaction rate is pH dependent, and slightly alkaline conditions, achieved by adding a weak base, such as sodium salicylate, give a faster reaction and therefore produce brighter light.

BRIEF SUMMARY OF THE INVENTION

The invention relates to a visual verification method that confirms that the lid of a collection bottle is completely closed. In one embodiment, the material is a biopsy tissue, blood or protein specimen, or other body fluids such as urine or aspirates, and the collection bottle is a specimen collection bottle. The medical personnel, in the case or tissue, blood, protein or other bodily fluids and or the patient, in the case of urine, who place the material into the specimen collection bottle can visually verify that the specimen collection bottle was opened and was closed securely at the time of taking the specimen. The lab courier pick-up also has quick visual verification that the specimen collection bottle lid was closed completely to avoid leakage or spillage during transport and to know that the staff opened the specimen collection bottle and closed it presumably to place a specimen inside the specimen collection bottle.

This visual verification can be accomplished without the need for costly manufacturing as it makes use of conventional specimen containers and manufacturing processes. By providing a qualitative color verification method, the method increases safety for the patient and decreases lost specimens in specimen collection bottles.

The collection bottle emits light once the lid of the collection bottle is rotated to its complete closed position. An annular chamber concentric to the inner chamber of the collection bottle, where a material is placed, contains a dye such as fluorophor, a base catalyst, and diphenyl oxalate. A containment device holding one or more vials containing hydrogen peroxide is disposed in the annular chamber. In one embodiment, the vials are made of glass.

In one embodiment, the exterior wall of the collection bottle that defines the exterior wall of the annular chamber comprises an elastomeric material, at least in the vicinity of the position of the containment device which is disposed in the interior of the annular chamber. A detent is disposed above the superior lid screw thread such that as the lid is screwed onto the collection bottle, the detent compresses the exterior wall of the collection bottle in the vicinity of the containment device. The exterior wall of the annular chamber is compressed by the detent in the lid screw thread, which action breaks the glass of the vials, causing rupture of the vial(s) and allowing the hydrogen peroxide disposed therein to mix with the dye, base catalyst and diphenyl oxalate disposed in the annular chamber. The collection bottle is shaken to mix the substances contained within the annular chamber with the substance(s) contained in the vials. The subsequent chemical reaction causes the emission of light thus indicating full closure of the lid on the collection bottle.

In one embodiment, the exterior wall of the collection bottle that defines the exterior wall of the annular chamber comprises an elastomeric material, at least in the vicinity of the position of the containment device which is disposed in the interior of the annular chamber. The exterior wall of the annular chamber is compressed by the user after the lid is placed on the collection bottle, which action breaks the glass of the vials. The collection bottle is shaken to mix the substances contained within the annular chamber with the substance(s) contained in the vials.

In one embodiment, the system and method can be used to confirm that a collection bottle was opened and then closed completely. In some situations, test reagents, proteins, chemicals, catalysts, antibodies and antigens for purposes of packaging and research that can be difficult to visualize as present are placed in a collection bottle for a future lab test and shipped. The system and method of the invention provides visual verification that the collection bottle was opened and closed completely, lessening the possibility of shipping an empty collection bottle that was not manipulated by the user to presumably place such materials in the collection bottle.

In one embodiment, the system and method may be used in any packaging container to confirm the presence of any medical or non-medical related material or to confirm that lids on any containers have been securely closed.

In one embodiment, various dye colors may be used and different colors may be produced in the ensuing chemical reaction.

In one embodiment, various concentrations of dyes, catalyst, base and substrates and peroxide may be altered to create longer or shorter lasting visual emission of light.

In one embodiment, one or more glass vials can be positioned inside the containment device in the annular chamber such that the they are sequentially compressed as the lid is rotatably screwed on the collection bottle upon closure.

BRIEF DESCRIPTION OF THE DRAWINGS

The various features of the present invention and the manner of attaining them will be described in greater detail with reference to the following description, claims, drawings, wherein like designations denote like elements.

DETAILED DESCRIPTION OF THE INVENTION

Figure 1:
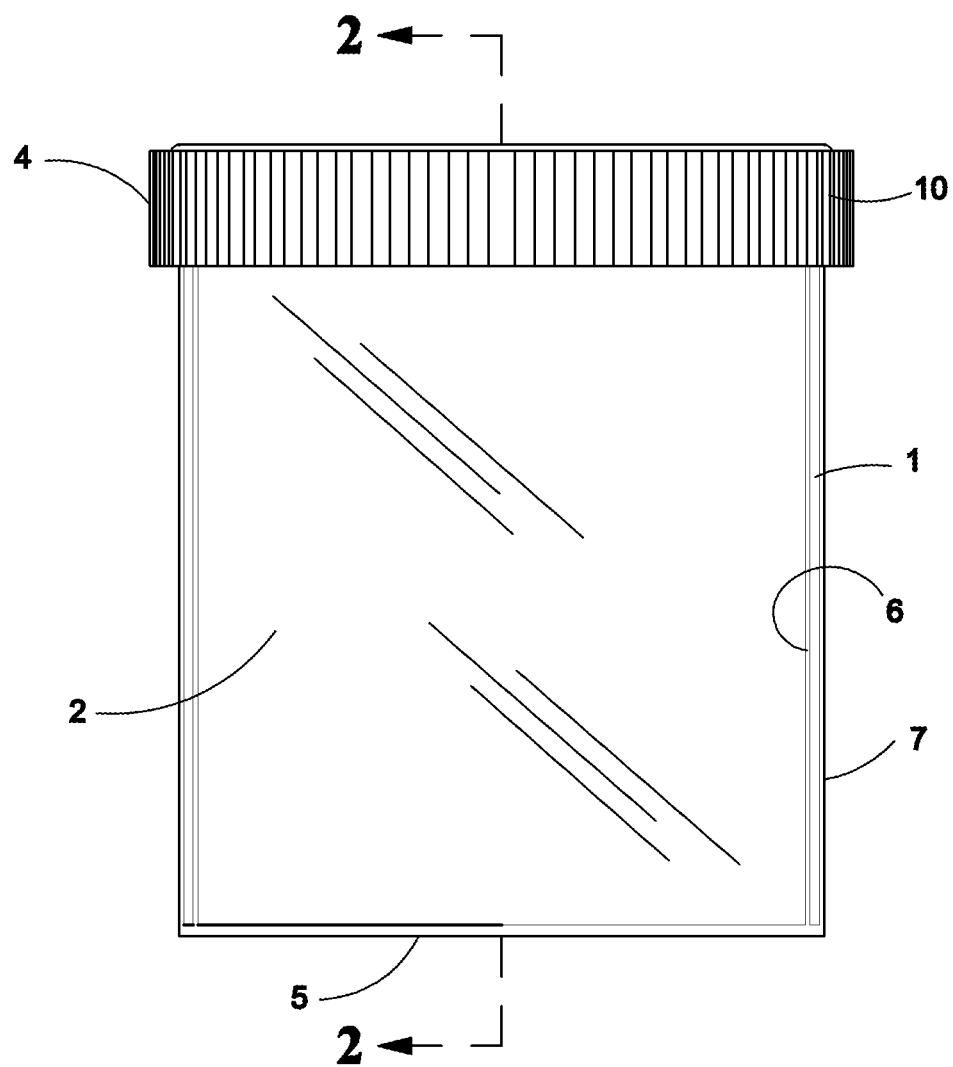
FIG. 1 is a front view of the container bottle shown with the lid in its fully closed position according to one embodiment of the invention.

The invention relates to a visual verification method that confirms that the lid of a collection bottle is completely closed. In one embodiment, the material is a biopsy tissue, blood, urine or protein specimen or other bodily fluids, and the collection bottle is a specimen collection bottle. The personnel, either medical or the patient, who place the material into the specimen collection bottle can visually verify that the specimen collection bottle was opened and was closed securely at the time of taking the specimen. The lab courier pick-up also has quick visual verification that the specimen collection bottle lid was closed completely to avoid leakage or spillage during transport and to know that the staff opened the specimen collection bottle and closed it presumably to place a specimen inside the specimen collection bottle.

This visual verification can be accomplished without the need for costly manufacturing as it makes use of conventional specimen containers and manufacturing processes. By providing a qualitative color verification method, the method increases safety for the patient and decreases lost specimens in specimen collection bottles.

The collection bottle comprises a generally circular container having a generally circular lid that closes onto and seals the collection bottle. The collection bottle comprises an inner chamber for holding a material, where the inner chamber is surrounded fully by a circumferential annular chamber. The annular chamber comprises a circumferential inner wall that defines the inner chamber and an exterior wall that serves as the exterior wall of the collection bottle. The annular chamber contains a number of chemicals that create a chemiluminescent reaction when mixed with peroxide, such as a dye (for example, fluorophore), a base catalyst, and diphenyl oxalate.

A containment device holding one or more vials containing hydrogen peroxide is disposed in the annular chamber, keeping the vials separated from the chemicals placed in the annular chamber until the lid is fully closed on the collection bottle. In one embodiment, the vials are made of glass. The containment device may be a ledge, or curvature, or shelf disposed above the position of the most superior thread of the lid screw threads when the lid is fully screwed onto the collection bottle. The containment device is situated so that it is not compressed upon initial removal of the lid by unscrewing the lid cap in a counterclockwise direction because the position of the detent is above the containment device prior to use of the collection bottle. The containment device can be made of soft plastic, or thin thermoplastic such as polypropylene, polyethyelene (PE) or compressible plastics. The vial can be made of a thin fragile plastic or a small breakable fragile glass.

In one embodiment, the exterior wall of the collection bottle that defines the exterior wall of the annular chamber comprises an elastomeric material, at least in the vicinity of the position of the containment device which is disposed in the interior of the annular chamber. A detent is disposed above the superior lid screw thread such that as the lid is screwed onto the collection bottle, the detent compresses the exterior wall of the collection bottle in the vicinity of the containment device.

Upon closing of the lid, the exterior wall of the annular chamber is compressed by the detent in the lid screw thread, which action breaks the glass of the vials, causing rupture of the vial(s) and allowing the hydrogen peroxide disposed therein to mix with the dye, base catalyst and diphenyl oxalate disposed in the annular chamber. The collection bottle is shaken to mix the substances contained within the annular chamber with the substance(s) contained in the vials. The subsequent chemical reaction causes the emission of light thus indicating full closure of the lid on the collection bottle.

In one embodiment, the exterior wall of the collection bottle that defines the exterior wall of the annular chamber comprises an elastomeric material, at least in the vicinity of the position of the containment device which is disposed in the interior of the annular chamber. The exterior wall of the annular chamber is compressed by the user after the lid is placed on the collection bottle, which action breaks the glass of the vials. The collection bottle is shaken to mix the substances contained within the annular chamber with the substance(s) contained in the vials.

When the hydrogen peroxide in the vials mixes with the chemicals in the annular chamber, a chemiluminescence reaction takes place. The hydrogen peroxide mixes with the dye, base, and chemicals contained within the annular chamber. They can be mixed, for example, by shaking of the container bottle. The reaction between the hydrogen peroxide and diphenyl oxalate may be catalyzed by a base, usually sodium salicylate, yielding two moles of phenol and one mole of peroxyacid ester (1,2-dioxetanedione). The peroxyacid decomposes spontaneously to form carbon dioxide and releases energy that excites the dye. As the dye relaxes back to its unexcited state, it releases a photon of visible light. The light emission confirms that the lid was securely closed over the container bottle rendering it leak and spill proof and suggesting the presence of any inserted material and in this case, as a medical specimen container bottle, human protein, blood, or tissue in the container bottle.

In one embodiment, the system and method can be used to confirm that a collection bottle was opened and then closed completely. In some situations, test reagents, proteins, chemicals, catalysts, antibodies and antigens for purposes of packaging and research that can be difficult to visualize as present are placed in a collection bottle for a future lab test and shipped. The system and method of the invention provides visual verification that the collection bottle was opened and closed completely, lessening the possibility of shipping an empty collection bottle that was not manipulated by the user to presumably place such materials in the collection bottle.

In one embodiment, the system and method may be used in any packaging container to confirm the presence of any medical or non-medical related material or to confirm that lids on any containers have been securely closed.

In one embodiment, various dye colors may be used and different colors may be produced in the ensuing chemical reaction.

In one embodiment, various concentrations of dyes, catalyst, base and substrates and peroxide may be altered to create longer or shorter lasting visual emission of light.

In one embodiment, one or more glass vials can be positioned inside the containment device in the annular chamber such that the they are sequentially compressed as the lid is rotatably screwed on the collection bottle upon closure.

The volume capacity of the liquid contents of the container bottle may be any size without limitation as can be the inner chamber, the annular chamber and the glass vials.

In one embodiment the glass vial is not disposed of above the threads of the exterior wall of the annular chamber but rather inside of the annular chamber beneath the inferior thread such that fingers can compress the exterior wall, breaking the glass the vials. The container bottle can then be shaken to mix the hydrogen peroxide released from the glass vials with the chemicals in the annular chamber.

Turning to the figures, FIG. 1 depicts a generally circular collection bottle 5 having a generally circular lid 4 that closes onto and seals collection bottle 5. Collection bottle 5 comprises an inner chamber 2 for holding a material, where the inner chamber 2 is surrounded fully by a circumferential annular chamber 1. Annular chamber 1 comprises an inner wall 6 that defines the inner chamber 2 and an exterior wall 7 that serves as the exterior wall of collection bottle 5. Annular chamber 2 contains a number of chemicals that create a chemiluminescent reaction when mixed with peroxide, such as a dye (for example, fluorophore), a base catalyst, and diphenyl oxalate.

Figure 2:
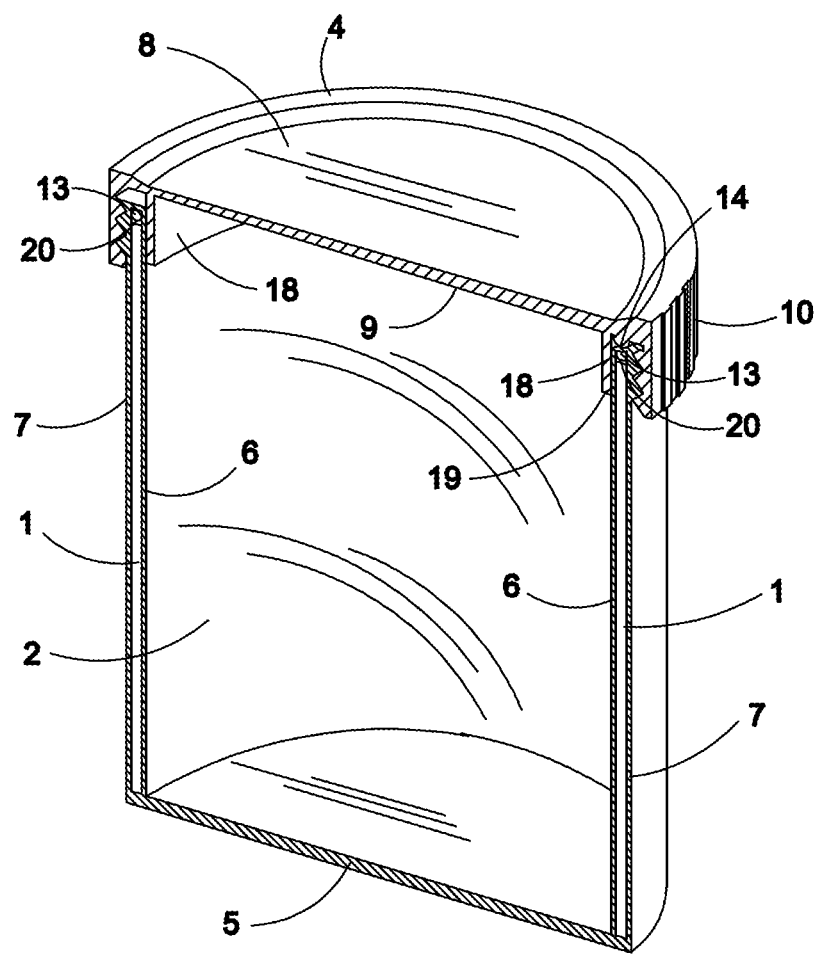
FIG. 2 is a perspective sectional view taken along line 2-2 of FIG. 1

As shown in FIG. 2, lid 4 is shown in its closed position on collection bottle 5. Lid 4 includes a top surface 8 and an inner surface 9. The periphery of lid 4 projects downwardly from the top surface 8 to form a shoulder which contains a plurality of indentations 10 oriented generally perpendicular to the top surface 8. In use, the plurality of indentations 10 facilitates gripping of the lid 4 when removing it from or placing it on collection bottle 5. A ledge 18 extends downwardly from inner surface 9 of lid 4, forming a flange 19 that mates with and covers annular chamber 1 when lid 4 is placed on collection bottle 5. A detent 14 is disposed on inner surface 9 of lid 4 just above superior annular internal screw thread 16a.

Figure 3:
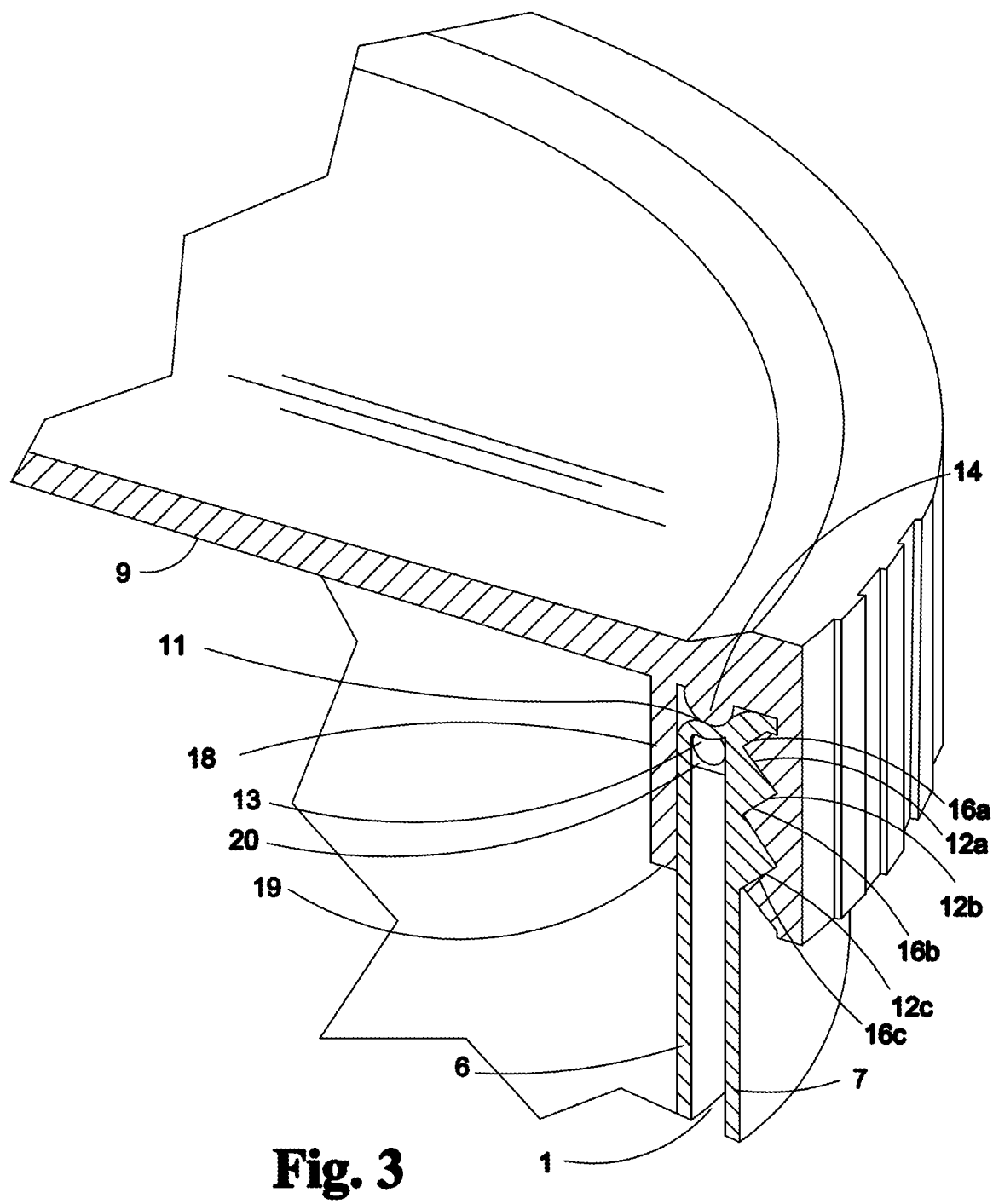
FIG. 3 is an enlarged view of section 3 encircled in FIG. 2.

In FIG. 3, upper end of exterior wall 7 terminates in an upper rim 11 that is continuous with and spans between exterior wall 7 and inner wall 6 across the top of annular chamber 1. Projecting outwardly at a perpendicular angle from exterior wall 7 of collection bottle 5 are a plurality of annular external screw threads, 12a, 12b, 12c, etc. Projecting inwardly at a perpendicular angle from the shoulder of lid 4 are a plurality of annular internal screw threads, 16a, 16b, 16c, etc. oriented to mate with annular external screw threads, 12a, 12b, 12c, etc. Disposed within annular chamber 1 at the top portion above superior thread 12a is containment device 20, within which are disposed one or more glass vials 13 each containing hydrogen peroxide.

Figure 4:
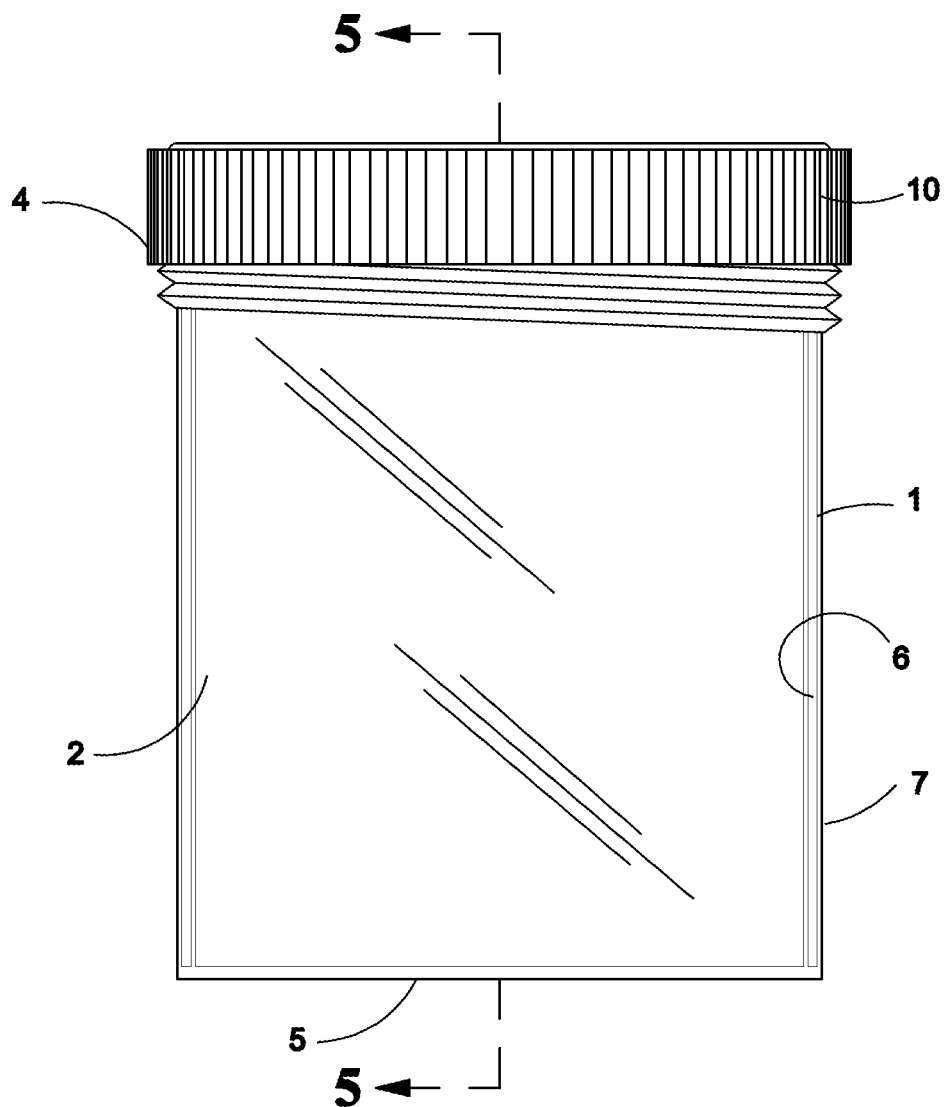
FIG. 4 is a front view of the container bottle shown with the lid in its partially opened position according to one embodiment of the invention.

In FIG. 4, lid 4 is in its partially opened position in relation to collection bottle 5. Lid 4 is rotated until it is removed in its entirety from collection bottle 5 and a material can be placed into inner chamber 2.

Figure 5:
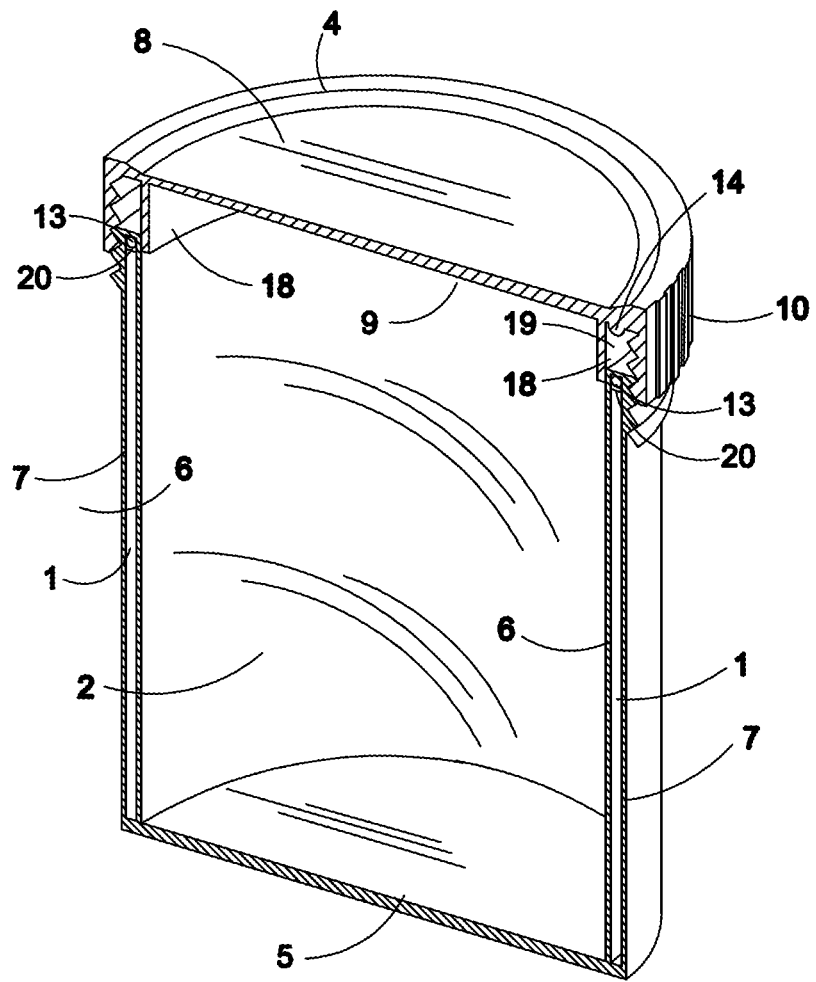
FIG. 5 is a perspective sectional view taken along line 5-5 of FIG. 4

As shown in FIG. 5, lid 4 includes a top surface 8 and an inner surface 9. The periphery of lid 4 projects downwardly from the top surface 8 to form a shoulder which contains a plurality of indentations 10 oriented generally perpendicular to the top surface 8. In use, the plurality of indentations 10 facilitates gripping of the lid 4 when removing it from or placing it on collection bottle 5. A ledge 18 extends downwardly from inner surface 9 of lid 4, forming a flange 19 that mates with and covers annular chamber 1 when lid 4 is placed on collection bottle 5. A detent 14 is disposed on inner surface 9 of lid 4 just above superior annular internal screw thread 16a.

Figure 6:
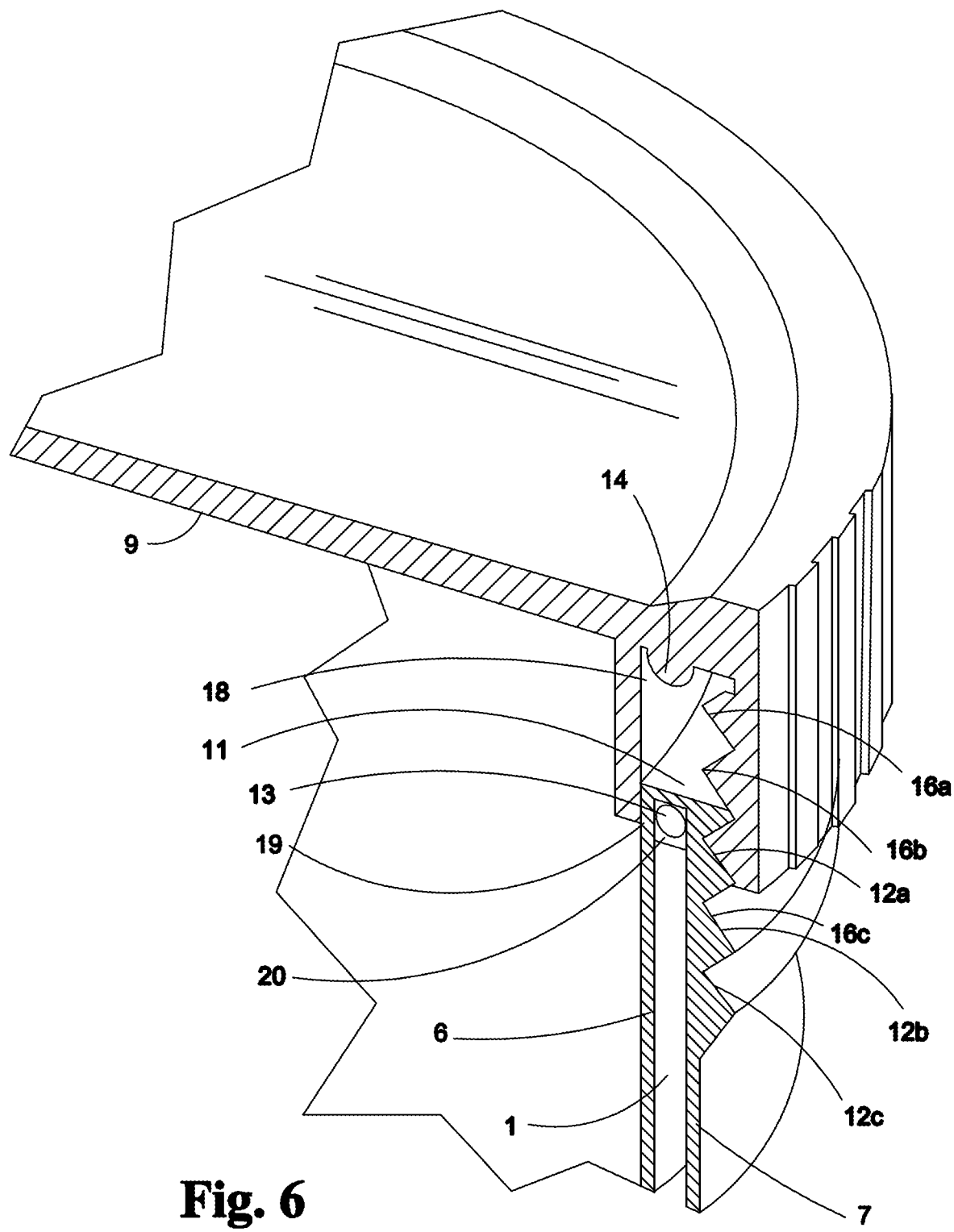
FIG. 6 is an enlarged view of section 6 encircled in FIG. 5

In FIG. 6, upper end of exterior wall 7 terminates in an upper rim 11 that is continuous with and spans between exterior wall 7 and inner wall 6 across the top of annular chamber 1. Projecting outwardly at a perpendicular angle from exterior wall 7 of collection bottle 5 are a plurality of annular external screw threads, 12a, 12b, 12c, etc. Projecting inwardly at a perpendicular angle from the shoulder of lid 4 are a plurality of annular internal screw threads, 16a, 16b, 16c, etc. oriented to mate with annular external screw threads, 12a, 12b, 12c, etc. Disposed within annular chamber 1 at the top portion above superior thread 12a is containment device 20, within which are disposed one or more glass vials 13 each containing hydrogen peroxide.

Figure 7:
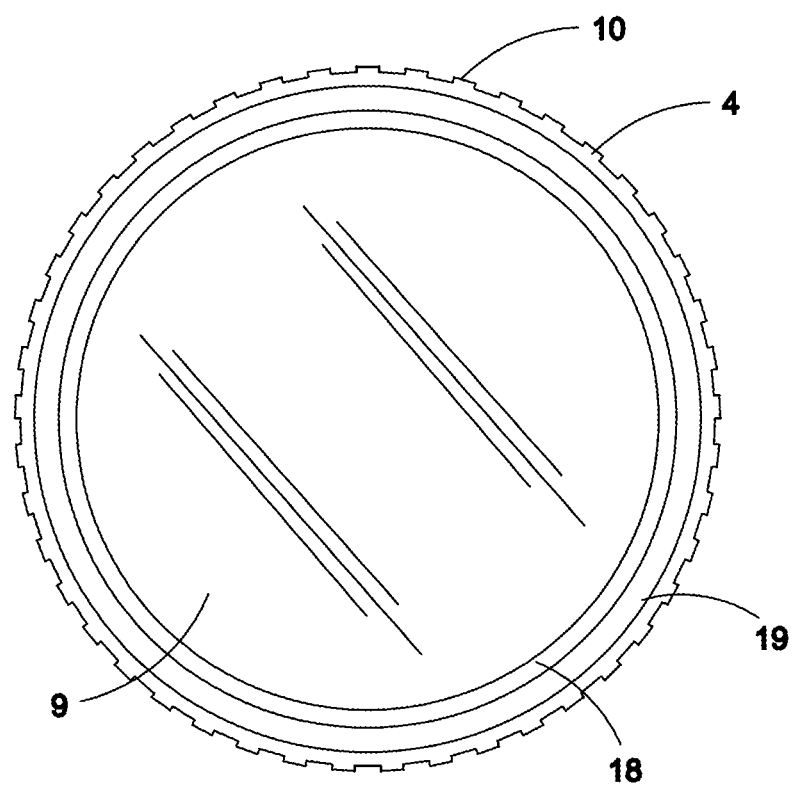
FIG. 7 is a bottom view of the i lid of the container bottle in accordance with the embodiment of the invention.

FIG. 7. shows inner surface 9 of lid 4. Groove 19 is configured to receive the rim 11 at the top of annular chamber 1 where interior wall 6 meets exterior wall 7, as lid 4 is closed. Inner surface 9 of the lid 4 has an annular flange 18 that mates with inner wall 6 of annular chamber 1 wall.

As lid 4 is placed on collection bottle 5, resistance is encountered to rotation when detent 14 engages with exterior wall 7 of collection bottle 5. As rotational pressure is exerted to overcome the resistance caused by detent 14, pressure is placed on the exterior wall 7 in the area above the superior annular external screw thread 16a and containment device 20. Through exertion of force to overcome the resistance, detent 14 breaks containment device 20, fracturing glass vials 13 and mixing their contents with the chemicals disposed in annular chamber 1. Upon continuing rotation, lid 4 will rotate only slightly more to its fully spill and leak proof position on collection bottle 5. The user can then agitate collection bottle 5 to mix the contents from glass vials 13 and annual chamber 1, causing the light reaction and subsequent emission of light.

Suitable materials for manufacturing collection bottle 5 and lid 4 include polymeric materials, which include without limitation polystyrene, polypropylene, polyethylene glycol, or any other suitable plastic material or glass and should be clear and transparent.

What is claimed is:

1. A collection bottle that provides visual verification of the closure of a lid, comprising:
   a circular collection bottle comprising:
      an exterior wall and an open top, wherein the exterior wall proximal the open top comprises a plurality of external threads, wherein the exterior wall comprises an elastomeric material;
      an interior wall disposed a fixed distance toward an interior of the collection bottle and defining an interior chamber within the collection bottle, wherein the interior wall and the exterior wall are connected by a rim element spanning between the interior wall and the exterior wall proximal the open top, wherein the space between the interior wall and the exterior wall define an annular chamber;
      a base catalyst, dye and diphenyl oxalate disposed in the annular chamber;
      a containment device disposed in the section of the annular chamber proximal the rim element; and
      a plurality of vials disposed in the containment device, wherein each of the plurality of vials contains hydrogen peroxide;
   and
   a circular lid comprising:
      a top surface, a bottom surface and a lip extending downward at a 90 degree angle from the top surface, wherein the lip comprises an exterior lip surface and an interior lip surface, wherein the interior lip surface comprises a plurality of internal threads; and
      a detent extending from the interior lip surface above a superior internal thread most proximal the bottom surface;
   wherein the plurality of external threads mate with the plurality of internal threads such that the lid closes on the collection bottle,
   wherein the detent causes resistance to closure of the lid on the collection bottle as the superior internal thread meets the exterior wall of the collection bottle,
   wherein force required to continue closure of the lid once the superior internal thread meets the exterior wall of the collection bottle places pressure on and breaks open the containment device, whereupon the plurality of vials is broken open, wherein the hydrogen peroxide from the vials mixes with the base catalyst, dye and diphenyl oxalate disposed in the annular chamber, whereupon reaction of the diphenyl oxalate with hydrogen peroxide forms 1,2-dioxetanedione, whereupon the 1,2-dioxetainedone reacts with the dye whereupon the dye is placed in an excited state, whereupon as the dye returns to its unexcited state, a photon of visible light is released.

2. The collection bottle of claim 1, wherein the containment device comprises a ledge, a curvature or a shelf.

3. The collection bottle of claim 2, wherein the containment device further comprises a soft plastic, a thin thermoplastic or a compressible plastic.

4. The collection bottle of claim 3, wherein the thin thermoplastic comprises polypropylene or polyethyelene.

5. The collection bottle of claim 1, wherein the vials comprise a thin fragile plastic or a small breakable fragile glass.

6. The collection bottle of claim 1, wherein the dye comprises one or more fluorophores.

7. The collection bottle of claim 1, wherein the collection bottle comprises a test tube or a biopsy specimen container.

8. A method of visual verification of the closure of a lid of a collection bottle, comprising:
   opening the lid from the collection bottle of claim 1;
   placing a material into an inner chamber of the collection bottle;
   closing the lid on the collection bottle; and
   shaking the collection bottle,
wherein the emission of light through a chemiluminescence reaction upon closure of the lid and shaking of the collection bottle confirms that the collection bottle has been opened and then closed.

9. The method of claim 8, wherein the dye comprises one or more fluorophores.

10. The method of claim 8, wherein the collection bottle comprises a test tube or a biopsy specimen container.

* * * * *